(12) United States Patent
Greaney et al.

(10) Patent No.: US 8,286,695 B2
(45) Date of Patent: Oct. 16, 2012

(54) INSERT AND METHOD FOR REDUCING FOULING IN A PROCESS STREAM

(75) Inventors: Mark A. Greaney, Upper Black Eddy, PA (US); James E. Feather, Burke, VA (US); Thomas Bruno, Raritan, NJ (US); ChangMin Chun, BelleMead, NJ (US); Clifford Hay, Baton Rouge, LA (US)

(73) Assignee: ExxonMobil Research & Engineering Company, Annandale, NJ (US)

( * ) Notice: Subject to any disclaimer, the term of this patent is extended or adjusted under 35 U.S.C. 154(b) by 1429 days.

(21) Appl. No.: 11/641,751

(22) Filed: Dec. 20, 2006

(65) Prior Publication Data

US 2007/0187078 A1  Aug. 16, 2007

Related U.S. Application Data (60) Provisional application No. 60/751,985, filed on Dec. 21, 2005, provisional application No. 60/815,844, filed on Jun. 23, 2006, provisional application No. 60/872,493, filed on Dec. 4, 2006.

(51) Int. Cl.
  *F28F 19/00* (2006.01)
  *F28F 13/18* (2006.01)
(52) U.S. Cl. .................... 165/134.1; 165/133
(58) Field of Classification Search .............. 165/133, 165/134.1; 148/286, 287, 427; 420/583
  See application file for complete search history.

(56) References Cited

U.S. PATENT DOCUMENTS

| | | | |
|---|---|---|---|
| 1,657,027 A | 1/1928 | Nelson | |
| 1,989,614 A * | 1/1935 | Halpern et al. | 285/55 |
| 3,835,817 A | 9/1974 | Tuomaala | |
| 3,969,153 A | 7/1976 | Suzuki et al. | |
| 4,162,617 A | 7/1979 | Schmidt et al. | |
| 4,168,184 A * | 9/1979 | Hultquist et al. | 428/472.1 |
| 4,230,507 A | 10/1980 | Obayashi et al. | |
| 4,297,150 A | 10/1981 | Foster et al. | |
| 4,369,101 A | 1/1983 | Wolff et al. | |
| 4,419,144 A | 12/1983 | Apblett, Jr. et al. | |
| 4,496,401 A | 1/1985 | Dawes et al. | |
| 4,505,017 A | 3/1985 | Schukei | |
| 4,524,996 A * | 6/1985 | Hunt | 285/55 |
| 4,596,611 A | 6/1986 | Dawes et al. | |
| 4,670,590 A | 6/1987 | Kambara et al. | |
| 4,810,532 A | 3/1989 | Lavendel et al. | |
| 4,881,983 A | 11/1989 | Smith et al. | |
| 4,891,190 A | 1/1990 | Carter et al. | |
| 4,933,071 A | 6/1990 | Heyse | |

(Continued)

FOREIGN PATENT DOCUMENTS

DE  19748240  5/2001

(Continued)

OTHER PUBLICATIONS

International Search Report, PCT Application No. PCT/US2006/048359, Nov. 13, 2007.

(Continued)

*Primary Examiner* — Tho V Duong
(74) *Attorney, Agent, or Firm* — Glenn T. Barrett (57) ABSTRACT

An insert for reducing sulfidation corrosion and depositional fouling is disclosed. The insert is formed from a corrosion and fouling resistant steel composition containing a Cr-enriched layer and having a surface roughness of less than 40 micro inches (1.1 μm).

7 Claims, 5 Drawing Sheets

U.S. PATENT DOCUMENTS

| | | | |
|---|---|---|---|
| 5,085,745 A | 2/1992 | Farber et al. | |
| 5,259,935 A | 11/1993 | Davidson et al. | |
| 5,263,267 A | 11/1993 | Buttner et al. | |
| 5,268,045 A | 12/1993 | Clare | |
| 5,296,199 A | 3/1994 | Kwok et al. | |
| 5,320,721 A | 6/1994 | Peters | |
| 5,396,039 A | 3/1995 | Chevrel et al. | |
| 5,479,959 A | 1/1996 | Stotelmyer et al. | |
| 5,499,656 A | 3/1996 | Stotelmyer et al. | |
| 5,507,923 A | 4/1996 | Stouse et al. | |
| 5,540,275 A | 7/1996 | Eisinger | |
| 5,714,015 A | 2/1998 | Lentz | |
| 5,873,408 A | 2/1999 | Bellet et al. | |
| 5,942,184 A | 8/1999 | Azuma et al. | |
| 5,951,787 A | 9/1999 | Ohmi et al. | |
| 5,985,428 A | 11/1999 | Chiba | |
| 6,038,882 A | 3/2000 | Kuroda et al. | |
| 6,156,440 A | 12/2000 | Suwa et al. | |
| 6,174,610 B1* | 1/2001 | Ohmi | 428/469 |
| 6,402,464 B1 | 6/2002 | Chiu et al. | |
| 6,413,407 B1 | 7/2002 | Bruns et al. | |
| 6,475,310 B1* | 11/2002 | Dunning et al. | 148/605 |
| 6,479,013 B1 | 11/2002 | Sera et al. | |
| 6,648,988 B2* | 11/2003 | Ramanarayanan et al. | 148/280 |
| 6,824,883 B1 | 11/2004 | Benum et al. | |
| 6,848,642 B2 | 2/2005 | Hitomi | |
| 6,856,665 B2 | 2/2005 | Hemmi et al. | |
| 6,878,932 B1 | 4/2005 | Kroska | |
| 2001/0027867 A1* | 10/2001 | Gandy et al. | 166/369 |
| 2002/0155306 A1* | 10/2002 | Anada et al. | 428/472.1 |
| 2002/0192494 A1* | 12/2002 | Tzatzov et al. | 428/655 |
| 2003/0022027 A1 | 1/2003 | Groll | |
| 2003/0098245 A1 | 5/2003 | Lin et al. | |
| 2003/0175544 A1 | 9/2003 | Ramanarayanan et al. | |
| 2004/0001966 A1 | 1/2004 | Subramanian et al. | |
| 2004/0119038 A1 | 6/2004 | Crockett et al. | |
| 2004/0131877 A1 | 7/2004 | Hasz et al. | |
| 2004/0191155 A1 | 9/2004 | Mahler et al. | |
| 2004/0265604 A1 | 12/2004 | Benum et al. | |
| 2005/0016828 A1 | 1/2005 | Bednarek et al. | |
| 2005/0045251 A1* | 3/2005 | Nishiyama et al. | 148/327 |
| 2005/0200354 A1 | 9/2005 | Edwin et al. | |
| 2006/0124472 A1 | 6/2006 | Rokicki | |
| 2006/0150358 A1 | 7/2006 | Bongiovanni | |

FOREIGN PATENT DOCUMENTS

| | | | |
|---|---|---|---|
| DE | 103 18 528 A1 | 11/2004 | |
| EP | 0 022 349 A | 1/1981 | |
| EP | 247209 B1 | 7/1990 | |
| EP | 203380 B1 | 10/1991 | |
| EP | 0596121 A1 | 5/1992 | |
| EP | 0698653 A1 | 8/1995 | |
| EP | 0716282 A | 6/1996 | |
| EP | 0 780 656 A | 6/1997 | |
| EP | 1052307 A2 | 5/2000 | |
| EP | 980729 B1 | 1/2001 | |
| EP | 1167866 A2 | 5/2001 | |
| EP | 1306469 A1 | 5/2003 | |
| EP | 1798511 A1 | 6/2007 | |
| FR | 2714359 | 6/1995 | |
| FR | 2 795 337 A1 | 12/2000 | |
| FR | 2 795 748 A | 1/2001 | |
| GB | 435870 A | 9/1936 | |
| GB | 532 144 A | 1/1941 | |
| GB | 846 994 | 9/1960 | |
| GB | 1099742 A | 1/1968 | |
| GB | 2147078 A | 5/1985 | |
| GB | 2152204 A | 7/1985 | |
| GP | 1 247 429 A | 9/1971 | |
| JP | 60023794 | 2/1985 | |
| JP | 61204399 | 9/1986 | |
| JP | 61204400 | 9/1986 | |
| JP | 62 017169 A | 1/1987 | |
| JP | 62214200 | 9/1987 | |
| JP | 01306599 | 12/1989 | |
| JP | 03180496 | 8/1991 | |
| JP | 03180497 | 8/1991 | |
| JP | 04311599 | 4/1992 | |
| JP | 07285027 | 10/1995 | |
| JP | 10204700 | 8/1998 | |
| KR | 2001105637 | 6/2002 | |
| RU | 2055709 C1 | 3/1996 | |
| SU | 246246 | 10/1969 | |
| SU | 260783 | 8/1970 | |
| SU | 357055 | 12/1972 | |
| SU | 496148 | 3/1976 | |
| SU | 776833 | 7/1980 | |
| SU | 981464 | 12/1982 | |
| SU | 1194914 A | 10/1985 | |
| SU | 1359085 A1 | 12/1987 | |
| SU | 1574687 A1 | 6/1990 | |
| WO | 9814297 | 4/1998 | |
| WO | WO 98/16792 A | 4/1998 | |
| WO | 9946112 | 9/1999 | |
| WO | WO 00/45965 A | 8/2000 | |
| WO | 0073722 A1 | 12/2000 | |
| WO | WO 02/08498 A | 1/2002 | |
| WO | 2004051174 A1 | 6/2004 | |
| WO | 2004108970 A2 | 12/2004 | |
| WO | 2006076161 A1 | 7/2006 | |

OTHER PUBLICATIONS

Written Opinion, PCT Application No. PCT/US2006/048359, Nov. 13, 2007.

J. Kruger, Passivity, Uhlig's Corrosion Handbook, Second Edition, 2000, pp. 165-171.

International Search Report, PCT Application No. PCT/US2007/011828, Dec. 21, 2007.

Singapore Application No. 200804404-2, Search Report from Austrian Patent Office, Aug. 10, 2010, 7 pgs.

Singapore Application No. 200804404-2, Written Opinion from Austrian Patent Office, Aug. 10, 2010, 8 pgs.

* cited by examiner

INSERT AND METHOD FOR REDUCING FOULING IN A PROCESS STREAM

CROSS REFERENCE TO RELATED APPLICATION

This application relates to and claims priority to U.S. Provisional Patent Application No. 60/751,985, filed Dec. 21, 2005, entitled "Corrosion Resistant Material For Reduced Fouling, A Heat Exchanger Having Reduced Fouling And A Method For Reducing Heat Exchanger Fouling in a Refinery", U.S. Provisional Patent Application No. 60/815,844, filed Jun. 23, 2006 entitled "A Method of Reducing Heat Exchanger Fouling in a Refinery" and U.S. Provisional Patent Application No. 60/872,493 filed Dec. 4, 2006 entitled "An Insert and Method For Reducing Fouling in A Process Stream," the disclosures of which are hereby incorporated specifically herein by reference.

FIELD OF THE INVENTION

This invention relates to the reduction of sulfidation or sulfidic corrosion and the reduction of depositional fouling in general and in particular the reduction of sulifidation/sulfidic corrosion and the reduction of depositional fouling in heat transfer components, which include but are not limited to heat exchangers, furnaces and furnace tubes located in refining facilities and petrochemical processing facilities and other components used for transporting or conveying process streams, which may be prone to fouling. In particular, the present invention relates to the reduction of corrosion and fouling associated with process streams. In particular, the present invention is directed to an insert for use in a heat transfer component and other components used for transporting or conveying process streams, which are subject to and prone to fouling wherein the insert is formed from a corrosion resistant material having a desired surface roughness. It is intended that the use of the insert is not limited to refinery and petrochemical processing applications; rather, it is contemplated that the insert in accordance with the present invention may be used to reduce fouling, corrosion or build-up in any conduit, which may susceptible to these mechanisms.

BACKGROUND OF THE INVENTION

Heat transfer components are used in refinery and petrochemical processing applications at various locations within the facilities to adjust the temperature (i.e., heat or cool) of the processed fluid (e.g., crude oil or derivatives thereof). The heat transfer components (e.g., a heat exchanger, furnaces, and furnace tubes) may be near the furnace to pre-heat the temperature of the oil prior to entry into the furnace (i.e., late-train). A typical tube-in-shell heat exchanger includes a plurality of tubes through which the oil may flow through and around. A hot fluid and a cold fluid enter separate chambers or tubes of the heat exchanger unit. The hot fluid transfers its heat to the cold fluid. The heat exchanger is designed to efficiently transfer heat from one fluid to another. The hot and cold fluids are never combined. Heat transfer occurs through the tube wall that separates the hot and cold liquids. By employing the correct flow rate and maximizing the area of the partition, heat exchanger performance can be optimally controlled. A variety of other heat exchanger designs, such as spiral heat exchangers, tube-in-tube heat exchangers and plate-and-frame heat exchangers operate essentially on the same principles.

During normal use with contact between the oil and the heat exchanger, corrosion and the build-up of deposits occurs. This build-up of deposits is often called fouling. Fouling adversely impacts the optimal control of the heat exchanger. Fouling in this context is the unwanted deposition of solids on the surfaces of the tubes of the heat exchanger, which leads to a loss in efficiency of the heat exchanger. Fouling is not limited to heat exchangers. Fouling may occur in other heat transfer components and transfer components for transferring process fluids. The loss in heat transfer efficiency results in higher fuel consumption at the furnace and reduced throughput. The buildup of foulants in fluid transfer components results in reduced throughput, higher loads on pumping devices and plugging of downstream equipment as large pieces of foulant periodically dislodge and flow downstream. As a result of fouling, the transfer components and heat transfer components must be periodically removed from service to be cleaned. This decreases overall facility reliability due to shutdowns for maintenance. This also leads to increased manpower requirements due to the number of cleaning crews required to service fouled heat exchanger and process fluid transfer tubes. Another detriment is an increase in volatile organic emission resulting from the cleaning process.

During normal use, the surfaces of the tubes of the heat exchanger are subject to corrosion as a result of the prolonged exposure to the stream of crude and other petroleum fractions. Corrosion on the surfaces of the tubes creates an uneven surface that can enhance fouling because the various particles found in the petroleum stream may attach themselves to the roughened surface. Fouling is not limited solely to the crude oils being processed. The vacuum residual streams are often used to heat the crude within the tubes. These streams often contain solids and are high fouling. In addition to those surfaces contacting the petroleum stream, those surfaces of the heat exchanger contacting the vacuum residual stream may also encounter fouling. Fouling can be associated with other process streams including but not limited to process gases (e.g., air).

While the problems of fouling extend beyond petroleum refining and petrochemical processing, the presence of crude oil presents numerous obstacles in preventing fouling that are unique to petroleum refining and petrochemical processing not present in other industries. Crude oil, in the context of fouling, is in reality more than simply a petroleum product produced from an underground reservoir. Crude oil is a complex mixture of organic and inorganic components which may result in a variety of foulant deposits on the surfaces of the heat exchanger including but not limited to both surfaces of the heat exchanger tubes, the baffles and the tube sheets. For example, crude oil as it is received at the refinery often contains corrosion byproducts such as iron sulfide, which are formed by the corrosion of drilling tubulars, pipelines, tanker holds and crude storage tanks. This material, under the right conditions, will deposit within heat exchangers resulting in depositional fouling. Crude oils often contain aqueous contaminants, some of which arrive at the refinery. Desalting is used to remove most of this material, but some of these contaminants pass through the desalter into the crude preheat train. These dissolved salts can also contribute to depositional fouling. Sodium chloride and various carbonate salts are typical of this type of foulant deposit. As more and more chemicals are used to enhance production of crude from old reservoirs, additional inorganic materials are coming to the refineries in the crude oil and potentially contributing to fouling.

Crude oils are typically blended at the refinery, and the mixing of certain types of crudes can lead to another type of foulant material. The asphaltenic material that is precipitated by blending of incompatible crudes will often lead to a predominantly organic type of fouling, which with prolonged heating, will form a carbonaceous or coke-like foulant deposit. Crude oils often also contain acidic components that directly corrode the heat exchanger materials as well. Naphthenic acids will remove metal from the surface and sulfidic components will cause sulfidic corrosion which forms iron sulfide. This sulfidic scale that is formed is often referred to as sulfide induced fouling.

Synthetic crudes are derived from processing of bitumens, shale, tar sands or extra heavy oils and are also processed in refinery operations. These synthetic crudes present additional fouling problems, as these materials are too heavy and contaminant laden for the typical refinery to process. The materials are often pre-treated at the production site and then shipped to refineries as synthetic crudes. These crudes may contain fine particulate silicaceous inorganic matter, such as in the case of tar sands. Some may also contain reactive olefinic materials that are prone to forming polymeric foulant deposits within heat exchangers. As can be understood from this discussion, crude oils are complex mixtures capable of forming a wide-range of foulant deposit types.

Currently, there are various techniques available for reducing fouling in refinery operations. One technique is avoiding the purchase of high-fouling crudes or corrosive crudes. This, however, reduces the pool of feedstock that is potentially available to the refinery. Additionally, the crude oil can be tested to determine whether or not the crude oil is compatible with the refinery. Again, this can reduce the feedstock potentially available to the refinery. Anti-foulant agents may also be added to the refinery stream. While these techniques are useful in reducing the rate of fouling within the heat transfer components, fouling can still occur under certain circumstances. The heat exchangers must still be routinely removed from service for cleaning to remove the build-up of contaminants. Furnace tubes must be taken off-line and steam-air decoked or pigged because of foulant deposition. Other alternative cleaning methods include the use of mechanical devices (e.g., "SPIRELF" and "brush and basket" devices). These devices, however, have low reliability and high maintenance needs.

There is a need to significantly reduce fouling in heat transfer components in refinery and petrochemical processing operations that does not encounter the drawbacks associated with the current techniques.

SUMMARY OF THE INVENTION

It is an aspect of the present invention to provide a heat transfer component that is resistant to fouling. The heat transfer component is used to either raise or lower the temperature of a process fluid or stream. The process fluid or stream is preferably crude oil based and is processed in a refinery or petrochemical facility. The present invention, however, is not intended to be limited solely to the use of crude oils, other process streams are considered to be well within the scope of the present invention. The heat transfer component may be a heat exchanger, a furnace, furnace tubes or any other component within a refinery or petrochemical facility that is capable of transferring heat from one medium to another which is also susceptible to fouling including but not limited to Crude Preheat, Coker preheat, FCC slurry bottoms, debutanizer exchanger/tower, other feed/effluent exchangers and furnace air preheaters in refinery facilities and flare compressor components and steam cracker/reformer tubes in petrochemical facilities. The heat transfer component contains at least one heat transfer element. It is contemplated that the heat transfer component is a heat exchanger for heating crude oil in a refinery stream prior to the crude entering a furnace, whereby the heat exchanger is resistant to fouling. The heat exchanger may be a tube-in-shell type heat exchanger having a tube bundle located within a housing. The present invention is not intended to be limited to tube-in-shell exchangers; rather, the present invention has application within other exchangers which are prone to fouling when subject to petroleum and/or vacuum residual streams. The tube-in-shell exchanger includes a housing having a wall forming a hollow interior. The wall has an inner surface that is adjacent the hollow interior. The heat transfer element may be a tube bundle located within hollow interior of the housing. The crude oil is heated within the hollow interior of the heat exchanger housing as the crude oil flows over the tube bundle. The tube bundle preferably includes a plurality of heat exchanger tubes.

In accordance with the present invention, each heat exchanger tube may be formed from an aluminum or aluminum alloy coated carbon steel or a steel composition that is resistant to sulfidation or sulfidic corrosion and fouling. The use of aluminum or aluminum alloy coated carbon steel or a steel composition that is resistant to sulfidation and fouling significantly reduces fouling and corrosion, which produces numerous benefits including an increase in heating efficiency, a reduction in the overall amount of energy needed to heat the crude oil, an increase in refinery throughput and a significant reduction in refinery downtime.

To further reduce and/or limit fouling, the heat transfer component may be subject to a vibrational force, which results in the development of a shear motion in the liquid flowing within the heat exchanger. This shear motion or turbulent flow within the heat transfer component limits the formation of any foulant on the surfaces of the component by reducing the viscous boundary layer adjacent the walls of the heat transfer element. Alternatively, the fluid flowing through the heat transfer component may be pulsed to reduce the viscous boundary layer.

It is preferable that at least one of the interior surface of the wall of the heat transfer component and the inner and/or outer surfaces of the plurality of heat exchanger tubes is formed in accordance with this invention to have a surface roughness of less than 40 micro inches (1.1 μm). Preferably, the surface roughness is less than 20 micro inches (0.5 μm). More preferably, the surface roughness is less than 10 micro inches (0.25 μm). It is contemplated that both the inner and outer surfaces of the plurality of heat exchanger tubes may have the above-mentioned surface roughness. Such a surface roughness significantly reduces fouling. The smooth surface within the inner diameter of the tubes reduces fouling of the petroleum stream flowing through the tubes. The smooth surfaces on the outer diameter of the tubes and on the inner surface of the housing will reduce fouling of the vacuum residual stream within the housing. It is also contemplated that the surfaces of the baffles located within the heat exchanger and the surfaces of the tube sheets, which secure the tubes in place may also have the above-mentioned surface roughness. Such a surface roughness would significantly reduce fouling on these components.

In accordance with another aspect of the present invention, the plurality of heat exchanger tubes are preferably formed from a steel composition with a chromium enriched layer. The composition of the steel forming the heat exchanger tubes is preferably formed from a metal composition containing X, Y and Z. In the context of the present invention, X denotes a metal that is selected from the group consisting of Fe, Ni, and Co. The group also contains mixtures of these components. Y denotes Cr. Finally, Z denotes at least one alloying element selected from the group consisting of Si, Al, Mn, Ti, Zr, Hf, V, Nb, Ta, Mo, W, Sc, Y, La, Ce, Pt, Cu, Ag, Au, Ru, Rh, Ir, Ga, In, Ge, Sn, Pb, B, C, N, O, P, and S. While other compositions are considered to be within the scope of the present invention, the above-described composition has been found to reduce fouling. The use of an aluminum or aluminum alloy coated carbon steel has also been found to reduce fouling and is considered to be within the scope of the present invention.

In this configuration, each of the plurality of heat exchanger tubes has a Cr-enriched layer. The Cr-enriched layer is formed on the tube and is formed from a steel having a similar composition to the above-described steel composition X, Y and Z. The Cr-enriched layer differs from the remaining portion of the heat exchanger tube in that the ratio of Y to X in the Cr-enriched layer being greater than the ratio of Y to X in the remaining portion of the tube. The Cr-enriched layer has a surface roughness of less than 40 micro inches (1.1 µm), preferably less than 20 micro inches (0.5 µm) and more preferably less than 10 micro inches (0.25 µm). The enriched layer is preferably formed on both the inner diameter surface and the outer diameter surface of the tube. The surfaces of the baffles and the tube sheets may also include a Cr-enriched and reduced surface roughness layer.

In accordance with another aspect of the present invention, it is contemplated that the Cr-enriched layer may be formed using one of several techniques. The Cr-enriched layer may be formed by electro-polishing the tube in a suitable solution (which may contain chromic acid when 5-chrome steels are used). Electro-polishing is effective when the Cr content in the steel composition is less than about 15 wt. %. While the concept of electro-polishing is known, the use of electro-polishing has primarily been limited to stainless steels wherein the Cr content in the steel composition is greater than about 18 wt. % and not for low-chromium steels such as a 5-chrome steel or a carbon steel.

The formation of the Cr enriched layer is not limited to the use of electro-polishing; rather, numerous other formation techniques are considered to be well within the scope of the present invention including but not limited to electroplating, bright annealing, passivation, thermal spray coating, laser deposition, sputtering, physical vapor deposition, chemical vapor deposition, plasma powder welding overlay, cladding, and diffusion bonding. It is contemplated that the corrosion resistant material, disclosed herein, may be used in other applications to reduce corrosion and fouling.

Each of the surfaces in the heat transfer components and particularly the heat exchanger tubes in accordance with the present invention preferably has a protective layer formed thereon. The surfaces of the baffles and the tube sheets may also include an enriched layer. The protective layer is preferably formed on the outer surface of the Cr-enriched layer. The protective layer may be an oxide layer, a sulfide layer, an oxysulfide layer or any combination thereof. The protective layer preferably includes a material selected from the group consisting of a magnetite, an iron-chromium spinel, a chromium oxide, oxides of the same and mixtures thereof. In the accordance with the present invention, the protective layer is preferably formed on the Cr-enriched layer after the heat exchanger tubes are located within the exchanger and the heat exchanger is operational. The protective layer forms when the Cr-enriched layer is exposed to the process streams (e.g., petroleum stream or vacuum residual stream or air) at high temperatures. The temperature at which the protective layer forms varies. In a late-train heat exchanger applications, the protective layer forms at temperatures up to 400° C. In applications in a furnace or outside the late-train heat exchanger, the protective layer forms at temperatures up to 600° C. In petrochemical applications including use in steam cracker and reformer tubes, the protective layer forms at temperatures up to 1100° C. The temperatures utilized during the formation of the protective layer will be dependent on the metallurgy of the steel being acted upon. The skilled artisan can easily determine the upper temperature constraints based on the steel's metallurgy.

It has also been found that aluminum or aluminum alloy coated carbon steels are effective in reducing fouling. The surfaces of these coated steels have a surface roughness of less than 40 micro inches (1.1 µm), preferably less than 20 micro inches (0.5 µm) and more preferably less than 10 micro inches (0.25 µm). The buildup of foulants in fluid transfer components results in reduced throughput, higher loads on pumping devices and plugging of downstream equipment as large pieces of foulant periodically dislodge and flow downstream. Similarly, titanium and titanium alloys can be effective in reducing fouling. The desired surface roughness may be obtained by electropolishing or honing the aluminum or titanium coating. The desired surface roughness may also be obtained by abrasive finishing methods including but not limited to precision grinding, microgrinding, mechanical polishing, lapping and heat treatment during the coated strip forming process.

It is another aspect of the present invention to provide a method of reducing fouling in a refinery or petrochemical facility. The method may result in significant cost savings because the number of scheduled downtimes to address heat transfer component fouling is significantly reduced. Furthermore, the heat transfer components operate more efficiently because the harmful effects of fouling are reduced. The present method is especially well suited for existing heat exchangers, which may presently be plagued with fouling. The method of reducing fouling in accordance with the present invention includes removing the existing heat exchanger tubes from the heat exchanger. The method further includes installing a plurality of replacement heat exchanger tubes.

While it is preferable to replace all of the existing heat exchanger tubes with replacement tubes having the above-described construction in order to maximize the reduction in fouling, the present invention is not intended to be so limited. It is also contemplated that only a portion of the existing heat exchanger tubes be replaced with replacement tubes. While such a construction may not result in the same reduction in fouling, a degree of fouling mitigation will be obtained. The determination of the number and location of existing tubes to be replaced by the replacement tubes can be determined by a physical inspection of the tubes within the bundle within the heat exchanger. It is contemplated that the existing tubes containing little or no fouling may remain. The present invention is not limited to retrofitting existing heat transfer components; rather, it is contemplated that the heat transfer components which exhibit fouling may be replaced with a new heat transfer component having the same desired material compositions and surface roughness described herein. Furthermore, it is contemplated that fouling can be mitigated in new refinery and/or petrochemical processing lines by installing heat transfer components having the same desired material compositions and surface roughness described herein.

It is another aspect of the present invention to reduce sulfidation or sulfidic corrosion and corrosion induced fouling.

While the primary objective of the present invention is to provide such resistance to corrosion and fouling in the context of heat transfer components subject to a flow of crude oil, the present invention is not intended to be so limited. It is contemplated that the present invention is suitable for use in other refining applications where the mitigation of fouling is a concern. In accordance with this aspect of the present invention, a method of providing sulfidation or sulfidic corrosion resistance and corrosion induced fouling resistance is disclosed. The method is suitable for use on a metal surface that is subject to a process stream (e.g., stream of crude oil or distilled fractions of crude oil) at high temperatures. In a late-train heat exchanger applications, the protective layer forms at temperatures up to 400° C. In applications in a furnace or outside the late-train heat exchanger, the protective layer forms at temperatures up to 600° C. In petrochemical applications including use in steam cracker and reformer tubes, the protective layer forms at temperatures up to 1100° C. The method includes providing a metal layer formed on a steel composition comprising X, Y, and Z. The material X is preferably a metal selected from the group consisting of Fe, Ni, Co, Ti and mixtures thereof. The material Y is Cr. It is also contemplated that the material Y may comprise Ni, O, Al, Si and mixtures thereof. The material Z is preferably at least one alloying element selected from the group consisting of Si, Al, Mn, Ti, Zr, Hf, V, Nb, Ta, Mo, W, Sc, Y, La, Ce, Pt, Cu, Ag, Au, Ru, Rh, Ir, Ga, In, Ge, Sn, Pb, B, C, N, O, P, and S. The metal layer preferably includes a Cr-enriched layer located thereon. Alternatively, the metal layer may include Ni, P, Al, Ti, Si, mixtures/compounds/alloys of these elements in an enriched layer located thereon. The enriched layer is formed from the same material X, Y and Z, however, the ratio of Y to X in the enriched layer is greater than the ratio of Y to X in the metal layer. The metal surface preferably has a surface roughness of less than 40 micro inches (1.1 µm). The surface roughness is preferably less than 20 micro inches (0.5 µm) and more preferably less than 10 micro inches (0.25 µm).

The method further includes forming a protective layer on a surface of the Cr-enriched layer. The layer is formed in-situ within the heat exchanger. The protective layer is preferably formed by exposing the Cr-enriched layer to a process stream at high temperatures. In late-train heat exchanger applications, the protective layer forms at temperatures up to 400° C. In applications in a furnace or outside the late-train heat exchanger, the protective layer forms at temperatures up to 600° C. In petrochemical applications including use in steam cracker and reformer tubes, the protective layer forms at temperatures up to 1100° C. The protective layer preferably includes a material selected from the group consisting of a magnetite, an iron-chromium spinel, a chromium oxide, other oxides and mixtures thereof. It is contemplated that the protective layer may contain a mixed oxide sulfide thiospinel.

It is another aspect of the present invention to combine corrosion resistance with a desired surface smoothness, which has synergistic impact on fouling mitigation. A smooth surface alone will reduce fouling temporarily, but with time and corrosion, the smoothness is lost and so is the initial benefit. Similarly, a rough textured, though corrosion-resistant surface is equally less effective at foulant reduction. In contrast, a smooth, corrosion-resistant surface will provide a long-lasting foulant resistant surface.

It is another aspect of the present invention to provide a corrosion resistant barrier layer on a heat transfer component with the application of vibration, pulsation or other internal turbulence promoters.

BRIEF DESCRIPTION OF THE DRAWINGS

The invention will now be described in connection with the following drawings in which like reference numerals designate like elements and wherein.

DETAILED DESCRIPTION OF PREFERRED EMBODIMENTS

Figure 1:
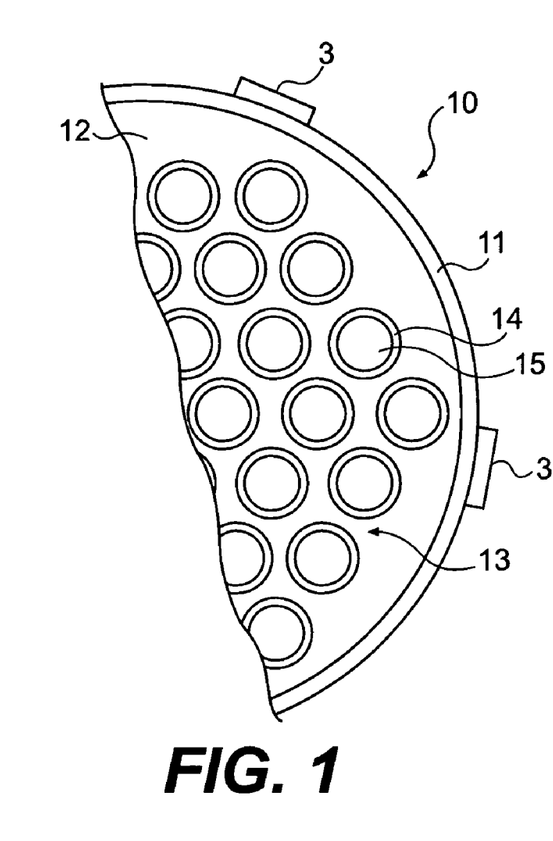
FIG. 1 is an example of heat exchanger having a plurality of heat exchanger tubes for use in a refinery operation.

The present invention will now be described in greater detail in connection with the attached figures. FIG. 1 is a tube-in-shell heat exchanger 10, which is located upstream from a furnace (not shown) and employs the principles of the present invention. The tube-in-shell heat exchanger 10 disclosed herein illustrates one application of the present invention to reduce sulfidation or sulfidic corrosion and depositional fouling in refinery and petrochemical applications. The tube-in-shell exchanger 10 is just one heat transfer component falling under the scope of the corrosion reduction and fouling mitigation measures in accordance with the present invention. The principles of the present invention are intended to be used in other heat exchangers including but not limited to spiral heat exchangers, tube-in-tube heat exchangers and plate-and-frame heat exchangers having at least one heat transfer element. The principles of the present invention are intended to be employed in other heat transfer components including furnaces, furnace tubes and other heat transfer components which may be prone to petroleum and/or vacuum residual fouling. The heat exchanger 10 is used to pre-heat crude oil in a refinery operation prior to entry into the furnace. The heat exchanger 10 includes a housing or shell 11, which surrounds and forms a hollow interior 12. A bundle 13 of heat exchanger tubes 14 is located within the hollow interior 12, as shown in FIG. 1. The bundle 13 includes a plurality of tubes 14. The tubes 14 may be arranged in a triangular configuration or a rectangular configuration. Other tube arrangements are contemplated and considered to be well within the scope of the present invention. Each tube 14 has a generally hollow interior 15 such that the crude oil to be heated flows therethrough. The heating or warming fluid (e.g., vacuum residual stream) flows through the hollow interior 12 to pre-heat the crude oil stream as the stream flows through the hollow interior 15 towards the furnace. Alternatively, it is contemplated that the crude oil may flow through the hollow interior 12 of the housing 11. The housing 11 and the tubes 14 are preferably formed from a steel composition. It is contemplated that the housing 11 and the tubes 14 may be formed from the same material. It is also contemplated that the housing 11 and the tubes 14 may be formed from different materials. Typically, the tubes and the housing are formed from a carbon or low chromium content steel.

Figure 5:
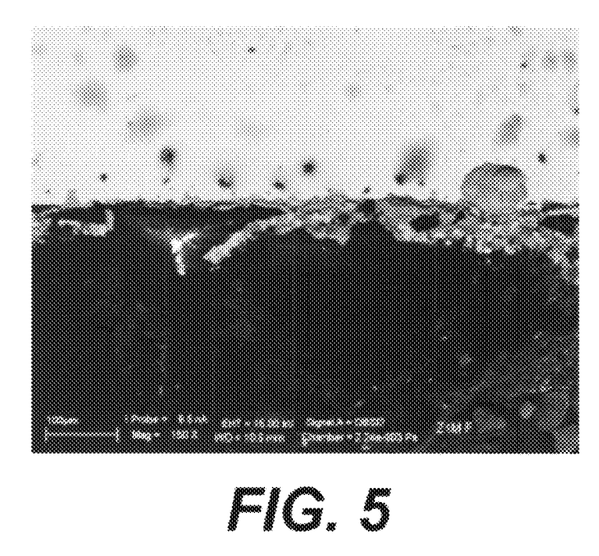
FIGS. 5 and 6 are images illustrating the fouling on a conventional heat exchanger tube after a field trial.
Figure 6:
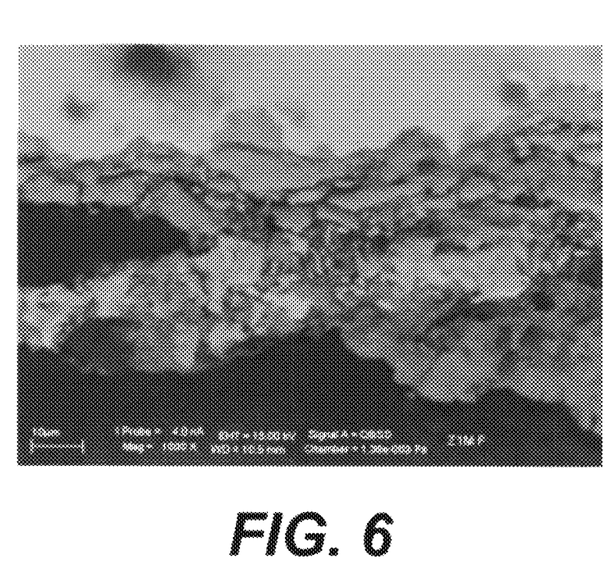

As described above, heat exchangers are typically subject to fouling after prolonged exposure to crude oil. The presence of fouling reduces the performance of the heat exchanger. FIGS. 5 and 6 illustrate the effects of fouling on the surface of a heat exchanger tube. The presence of fouling reduces throughput and increases fuel consumption. FIGS. 5 and 6 illustrate the amount of fouling present within the heat exchanger tube after five months of operation. This fouling represents an approximately 31% reduction in the heat exchanger efficiency in the refinery. The foulant contains sodium chloride, iron sulfide and carbonaceous materials. As shown in FIGS. 5 and 6, significant amounts of pitting are present. Pitting can further exacerbate the fouling problem.

Figure 7:
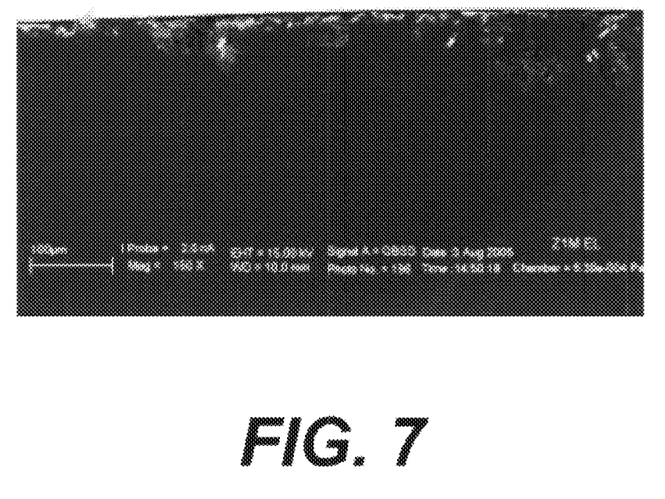
FIGS. 7 and 8 are images illustrating the significant reduction in fouling on a heat exchanger tube in accordance with the present invention after a field trial.
Figure 8:
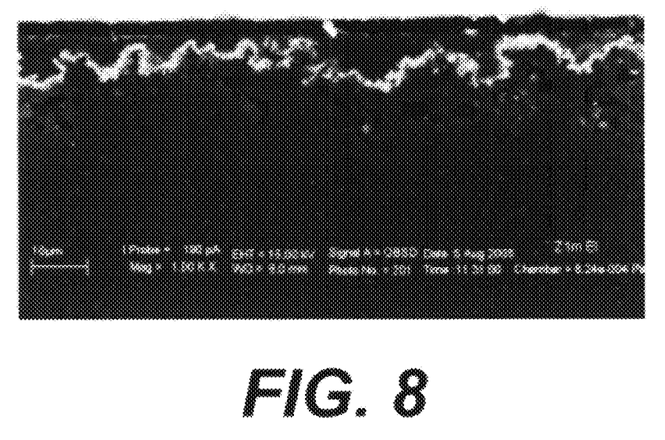

By contrast, FIGS. 7 and 8 illustrate the reduction in fouling utilizing heat exchanger tubes 14 which embody the principles of the present invention. The surface cross-sections illustrated in FIGS. 7 and 8 illustrate a marked reduction in fouling. These tubes were located in the same heat exchanger and subject to the same operating conditions over the same five month period. While the foulant present in the exchanger tube 14 also contained sodium chloride, iron sulfide and carbonaceous material, the amount of foulant was significantly reduced. The thickness of the foulant was reduced to less than 10 microns. The tubes having the reduced surface roughness also exhibited less pitting. The conventional tubes illustrated in FIGS. 5 and 6 exhibited a mean foulant deposit weight density of 46 mg/cm$^2$. By contrast, the tubes 14 constructed using principles in accordance with the present invention illustrated at least 50% reduction in the mean foulant deposit weight density. The sample tubes exhibited a mean foulant deposit weight density of 22 mg/cm$^2$. Deposit weight density was determined by the National Association of Corrosion Engineers (NACE) method TM0199-99. The reduction in fouling shown in FIGS. 7 and 8 illustrate the benefits of the present invention.

The reduction in fouling may be obtained as a result of controlling the surface roughness of the inner diameter surface and the outer diameter surface of the tubes 14 and/or the interior surface of the shell 11. Controlling the surface roughness of the inner diameter surface of the tubes mitigates the fouling of process fluid or crude oil within the tubes 14. Controlling the surface roughness of the outer diameter surface of the tubes 14 and the inner surface of the shell 11 mitigates fouling associated with the heating fluid (e.g., vacuum residual) flowing within the hollow interior 12. In accordance with the present invention, at least one of the interior surface of the hollow interior 12 and the surfaces of the tubes 14 has a surface roughness of less than 40 micro inches (1.1 µm). Surface roughness can be measured in many ways. Industry prefers to use a skidded contact profilometer. Roughness is routinely expressed as the arithmetic average roughness (Ra). The arithmetic average height of roughness component of irregularities from the mean line is measured within the sample length L. The standard cut-off is 0.8 mm with a measuring length of 4.8 mm. This measurement conforms to ANSI/ASME B46.1 "Surface Texture-Surface Roughness, Waviness and Lay," which was employed in determining the surface roughness in accordance with the present invention. A uniform surface roughness of less than 40 micro inches (1.1 µm) produces a significant reduction in fouling.

Further reductions in surface roughness are desirable. It is preferable that the surface roughness be below 20 micro inches (0.5 µm). It is more preferable that the surface roughness be below 10 micro inches (0.25 µm). It is preferable that both the inner diameter surface and the outer diameter surface have the described surface roughness. The desired surface roughness may be obtained through various techniques including but not limited to mechanical polishing and electropolishing. In the samples illustrated in FIGS. 5 and 6, the surface roughness of the tubes was variable between 38 and 70 micro inches. The tubes in FIGS. 5 and 6 were not polished. The tubes illustrated in FIGS. 7 and 8, which form the basis for the present invention were polished to a more uniform 20 micro inches (0.5 µm). This was accomplished using conventional mechanical polishing techniques. The tubes were then electro-polished in an acidic electrolyte to produce a reflective surface having a surface roughness below 10 micro inches (0.25 µm). The treated tubes exhibited a marked reduction in fouling.

Figure 2:
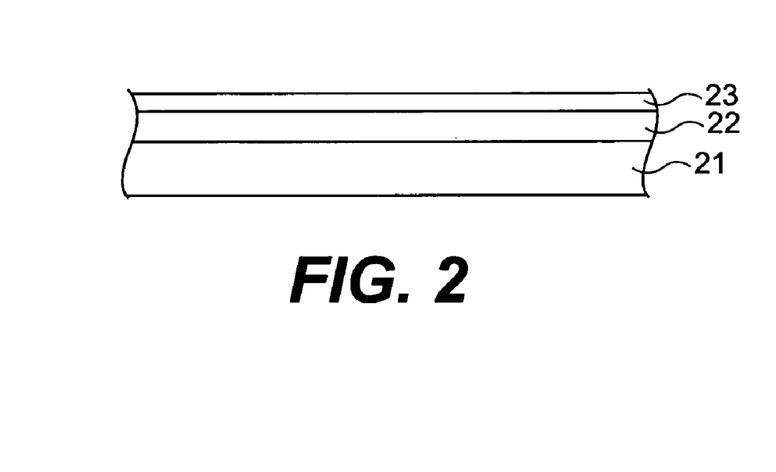
FIG. 2 is a schematic view illustrating the various layers forming the steel composition utilized in forming the heat transfer components in accordance with an embodiment of the present invention.
Figure 4:
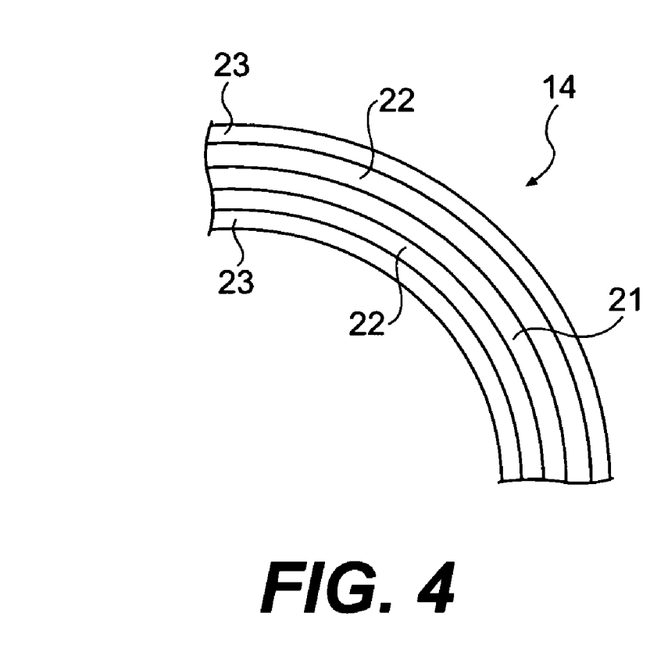
FIG. 4 is a partial sectional view of a heat exchanger tube in accordance with the present invention.

In accordance with the present invention, it is preferable that the tubes 14 be formed from a steel composition that is resistant to sulfidation or sulfidic corrosion and depositional fouling. The use of such a steel composition significantly reduces fouling, which produces numerous benefits including an increase in heating efficiency, a reduction in the amount of energy needed to pre-heat the crude oil, and a significant reduction in refinery downtime and throughput. It is preferable that the tubes 14 and/or the housing 11 of the pre-heat exchanger have several layers, as illustrated in FIGS. 2 and 4. The primary layer 21 is a steel composition containing three primary components or constituents X, Y and Z. X denotes a metal that is selected from the group preferably consisting of Fe, Ni, and Co. X may also contain mixtures of Fe, Ni and Co. Y denotes Cr. In accordance with the present invention, a steel composition contains Cr at least greater than 1 wt. % based on the combined weight of the three primary constituents X, Y and Z. Higher Cr contents are desirable for improved sulfidation or sulfidic corrosion resistance. It is preferable that the Cr content be higher than 5 wt. % based on the combined weight of three primary constituents X, Y and Z. It is more preferable that the Cr content be higher than 10 wt. % based on the combined weight of three primary constituents X, Y and Z. Z is preferably an alloying element.

In accordance with the present invention, Z preferably includes at least one alloying element selected from the group consisting of Si, Al, Mn, Ti, Zr, Hf, V, Nb, Ta, Mo, W, Sc, Y, La, Ce, Pt, Cu, Ag, Au, Ru, Rh, Ir, Ga, In, Ge, Sn, Pb, B, C, N, O, P, and S. Z may also contain mixtures of Si, Al, Mn, Ti, Zr, Hf, V, Nb, Ta, Mo, W, Sc, Y, La, Ce, Pt, Cu, Ag, Au, Ru, Rh, Ir, Ga, In, Ge, Sn, Pb, B, C, N, O, P, and S. The weight percent of an alloying element is preferably higher than 0.01 wt. %, and more preferably higher than 0.05 wt. %, and most preferably higher than 0.1 wt. %, based on the combined weight of three primary constituents X, Y and Z. The combined weight percent of all alloying elements in a steel composition is preferably less than 10 wt. %, and more preferably less than 5 wt. %, based on the combined weight of three primary constituents X, Y and Z. While other compositions are considered to be within the scope of the present invention, the above-described composition has been found to reduce fouling.

Table 1 illustrates non-limiting examples of a steel composition that is resistant to sulfidation or sulfidic corrosion and corrosion induced fouling for use in both refining and petrochemical applications. Other materials exhibiting similar properties are considered to be well within the scope of the present invention provided such materials fall within the scope of the prescribed ranges.

TABLE 1

| Name (Grade) | UNS Number | Constituent X in wt. % | Constituent Y in wt. % | Constituent Z in wt. % |
|---|---|---|---|---|
| T11 | K11562 | Balanced Fe | 1.25Cr | 0.5Mo, 0.5Si, 0.3Mn, 0.15C, 0.045P, 0.045S |
| T22 | K21590 | Balanced Fe | 2.25Cr | 1.0Mo, 0.5Si, 0.3Mn, 0.15C, 0.035P, 0.035S |
| T5 | S50100 | Balanced Fe | 5Cr | 0.5Mo, 0.5Si, 0.3Mn, 0.15C, 0.04P, 0.03S |
| T9 | J82090 | Balanced Fe | 9Cr | 1.0Si, 0.35Mn, 0.02C, 0.04P, 0.045S |
| 409 | S40900 | Balanced Fe | 10.5Cr | 1.0Si, 1.0Mn, 0.5Ni, 0.5Ti, 0.08C, 0.045P, 0.045S |
| 410 | S41000 | Balanced Fe | 11.5Cr | 0.15C, 0.045P, 0.03S |
| 430 | S43000 | Balanced Fe | 16Cr | 1.0Si, 1.0Mn, 0.12C, 0.045P, 0.03S |
| XM-27 E-Brite | S44627 | Balanced Fe | 25Cr | 0.5Ni, 0.75Mo, 0.4Si, 0.4Mn, 0.05Nb, 0.2Cu, 0.01C, 0.02P, 0.02S, 0.015N |
| SeaCure | S44660 | Balanced Fe | 25Cr | 1.5Ni, 2.5Mo, 1.0Si, 1.0Mn, 0.05Nb, 0.2Cu, 0.025C, 0.04P, 0.03S, 0.035N |
| 304 | S30400 | Bal. Fe, 8Ni | 18Cr | 2.0Mn, 0.75Si, 0.08C, 0.04P, 0.03S |
| 304L | S30403 | Bal. Fe, 8Ni | 18Cr | 2.0Mn, 0.75Si, 0.035C, 0.04P, 0.03S |
| 309S | S30908 | Bal. Fe, 12Ni | 22Cr | 2.0Mn, 0.75Si, 0.75Mo, 0.08C, 0.045P, 0.03S |
| 310 | S31000 | Bal. Fe, 19Ni | 24Cr | 2.0Mn, 1.5Si, 0.75Mo, 0.25C, 0.045P, 0.03S |
| 316 | S31600 | Bal. Fe, 11Ni | 16Cr | 2.0Mn, 0.75Si, 2.0Mo, 0.08C, 0.04P, 0.03S |
| 316L | S31603 | Bal. Fe, 11Ni | 16Cr | 2.0Mn, 0.75Si, 2.0Mo, 0.035C, 0.04P, 0.03S |
| 321 | S32100 | Bal. Fe, 9Ni | 17Cr | 2.0Mn, 0.75Si, 0.4Ti, 0.08C, 0.045P, 0.03S |
| 2205 | S32205 | Bal. Fe: 4.5Ni | 22Cr | 2.0Mn, 1.0Si, 3.0Mo, 0.03C, 0.14N, 0.03P, 0.02S |
| 2507 | S32507 | Bal. Fe: 6Ni | 24Cr | 1.2Mn, 0.8Si, 3.0Mo, 0.5Cu, 0.03C, 0.2N, 0.035P, 0.02S |
| AL-6XN | N08367 | Bal. Fe: 24Ni | 20Cr | 6.2Mo, 0.4Si, 0.4 Mn, 0.22N, 0.2Cu, 0.02C, 0.02P, 0.03S, 0.035N |
| Alloy 800 | N08800 | Bal. Fe: 30Ni | 19Cr | 0.15Ti, 0.15Al |

The chromium enrichment at the surface of the non-fouling surface is advantageous. Therefore, the steel composition preferably includes a chromium enriched layer 22. The Cr-enriched layer 22 is formed on the primary layer 21. The layer 22 may be formed on both the inner surface and the exterior surface of the tubes. The thickness of the Cr-enriched layer 22 is greater than 10 angstroms. The Cr-enriched layer 22 contains the same three primary components or constituents X, Y and Z. X denotes a metal that is selected from the group preferably consisting of Fe, Ni, and Co. X may also contain mixtures of Fe, Ni, Co and Ti. Y denotes Cr. It is contemplated that Y may also comprise Ni, O, Al, Si and mixtures thereof. The percentage of Cr is higher in layer 22 when compared to the primary layer 21. In accordance with the present invention, Cr content in layer 22 is at least greater than 2 wt. % based on the combined weight of three primary constituents X, Y and Z. It is preferable that the Cr content be higher than 10 wt. % based on the combined weight of three primary constituents X, Y and Z. It is more preferable that the Cr content be higher than 30 wt. % based on the combined weight of three primary constituents X, Y and Z. In the layer 22, the ratio of Y to X is greater than the ratio of Y to X in the layer 21. The ratio should be greater by a factor of at least 2. The ratio should preferably be greater by a factor of at least four. More preferably, the ratio should be a greater by a factor of eight. Z is preferably an alloying element.

For example, 5-chrome steel (T5) nominally contains about 5 wt. % chromium per about 95 wt. % iron to give an untreated surface ratio of 0.05 in the primary layer 21. In the Cr-enriched layer 22, the ratio increased to at least 0.1, preferably to 0.2 and most preferably to 0.4 chromium atoms per iron atom in the surface layer of the heat exchanger tube. For 316L stainless steel, which has nominally 16 wt. % Cr, 11 wt. % Ni, 2 wt. % Mn, 2 wt. % Mo, the bulk ratio of chromium to iron would be 16/69=0.23. After treatment to enrich the surface chromium, the ratio may rise to at least 0.46, preferably 0.92 and most preferably 1.84.

In the Cr-enriched layer 22, Z preferably includes at least one alloying element selected from the group consisting of Si, Al, Mn, Ti, Zr, Hf, V, Nb, Ta, Mo, W, Sc, Y, La, Ce, Pt, Cu, Ag, Au, Ru, Rh, Ir, Ga, In, Ge, Sn, Pb, B, C, N, O, P, and S. The weight percent of an alloying element is preferably higher than 0.01 wt. %, and more preferably higher than 0.05 wt. %, and most preferably higher than 0.1 wt. %, based on the combined weight of three primary constituents X, Y and Z.

It is contemplated that the Cr-enriched layer 22 may be formed on two sides of the primary layer 21 such that both the interior surface and the exterior surface contain a Cr-enriched layer. The Cr-enriched layer 22 may be formed on the primary layer 21 using one of several techniques. The Cr-enriched layer may be formed by electro-polishing the tube in a solution containing chromic acid. This is effective when the Cr content in the steel composition is less than about 15 wt. %. It is also contemplated that the Cr-enriched layer 22 may be formed using various other formation techniques including but not limited to electroplating chromium onto another alloy such as a carbon steel, bright annealing, passivation, thermal spray coating, laser deposition, sputtering, physical vapor deposition, chemical vapor deposition, plasma powder welding overlay, cladding, and diffusion bonding. It is also possible to choose a high chromium alloy including but not limited to 304L stainless steel, 316 stainless steel and AL6XN alloy. In accordance with the present invention, the secondary layer 22 may be mechanically polished and/or electro-polished as described above in order to obtain a uniform surface roughness of less than 40 micro inches (1.1 μm), preferably less than 20 micro inches (0.5 μm) and more preferably less than 10 micro inches (0.25 μm). The desired surface roughness can also be achieved using fine abrasive polishing or metal peening.

The Cr-enriched layer 22 may be formed on the primary layer 21 by bright annealing the tube. Bright annealing is an annealing process that is carried out in a controlled atmosphere furnace or vacuum in order that oxidation is reduced to a minimum and the surface remains relatively bright. The process conditions such as atmosphere, temperature, time and heating/cooling rate utilized during the bright annealing process will be dependent on the metallurgy of the alloy being acted upon. The skilled artisan can easily determine the conditions based on the alloy's metallurgy. As a non-limiting example, the austenitic stainless steel such as 304L can be bright annealed in either pure hydrogen or dissociated ammonia, provided that the dew point of the atmosphere is less than −50° C. and the tubes, upon entering the furnace, are dry and scrupulously clean. Bright annealing temperatures usually are above 1040° C. Time at temperature is often kept short to hold surface scaling to a minimum or to control grain growth.

In accordance with the present invention, a protective layer 23 is preferably formed on the Cr-enriched layer 22. The Cr-enriched layer 22 is necessary for the formation of the protective layer 23. The protective layer may be an oxide layer, a sulfide layer, an oxysulfide layer or any combination thereof. The protective layer 23 preferably includes a material such as a magnetite, an iron-chromium spinel, a chromium oxide, oxides of the same and mixtures thereof. The layer 23 may also contain a mixed oxide sulfide thiospinel. While it is possible to form the protective layer 23 on the Cr-enriched layer 22 prior to installation of the tubes 14 within the housing 11 of the pre-heat exchanger 10, the protective layer 23 is preferably formed on the Cr-enriched layer 22 after the tubes 14 are located within the exchanger 10 and the pre-heat exchanger is operational. The protective layer 23 forms when the Cr-enriched layer is exposed to the process stream at high temperatures. In a late-train heat exchanger application, the protective layer forms at temperatures up to 400° C. In applications in a furnace or outside the late-train heat exchanger, the protective layer forms at temperatures up to 600° C. In petrochemical applications including use in steam cracker and reformer tubes, the protective layer forms at temperatures up to 1100° C. The thickness of the protective layer 23 is preferably greater than 100 nm, more preferably greater than 500 nm, and most preferably greater than 1 micron. As illustrated in FIGS. 6 and 7, a field trial of 5-chrome steel revealed about 1 micron thick Cr-enriched magnetite layer formed during about 4 months of period. Since the stream oil flowing within a heat exchanger tube is a highly reducing and sulfidizing environment, the protective layer 23 can further convert to a mixed oxide-sulfide layer or a thiospinel-type sulfide layer after prolonged exposure. Applicants note that the formation of the protective layer 23 is a result of the electropolishing of the Cr-enriched layer 21.

The formation of the protective layer further reduces fouling. The foulants, which form on the protective layer 23 exhibit significantly less adhesion characteristics when compared to foulants, which form on surfaces that do not have the protective layer. One benefit of this reduced adhesion lies in the cleaning of the heat exchange surface. Less time is required to remove any foulants from the tubes. This results in a decrease in downtime such that the pre-heat exchanger can be serviced in a more efficient manner and placed back online sooner. Also, with a less adherent deposit, on-line cleaning methods may become more effective or at least more rapid, which will further reduce downtime and throughput loss.

There are numerous additional benefits of reducing the surface roughness of the tubes 14. One of the benefits is the shifting from a linear growth rate of the foulant, which results in the continuous thickening of the foulant deposit; to an asymptotic growth rate which reaches a finite thickness and then stops thickening.

The tubes 14 disclosed above may be used to form new heat exchangers. The tubes 14 can also be used in existing exchangers as replacement tubes. The use of the tubes 14 should produce significant benefits in the refinery operations. In addition to reducing fouling, there is a reduction in the number of scheduled downtimes the heat exchangers operate more efficiently because the harmful effects of fouling are reduced. In addition, as demonstrated in the field test, the use of the tubes 14 will also prolong tube life due to reduced pitting corrosion.

The tubes 14 in accordance with the present invention may be used to retrofit an existing heat exchanger during a scheduled downtime. The existing tubes can be removed from the heat exchanger. The tubes 14 having the above described surface roughness and/or material composition are installed in the interior 12 of the housing 11. While it is preferable to replace all of the existing heat exchanger tubes with replacement tubes having the above-described construction in order to maximize the reduction in fouling, the present invention is not intended to be so limited. It is contemplated that only a portion of the existing heat exchanger tubes be replaced with replacement tubes. While such a construction may not result in the same reduction in fouling, a degree of fouling mitigation will be obtained. The determination of the number and location of existing tubes to be replaced by the replacement tubes can be determined by a physical inspection of the tubes within the bundle within the heat exchanger. The tubes located closest to the furnace may be more prone to fouling. As such, it is also contemplated that tubes located most closely to the furnace may be replaced with tubes 14.

It may not be cost effective to replace all or a portion of the tubes of the heat transfer component with tubes 14 constructed in accordance with the principles of the present invention. In accordance with another aspect of the present invention, an insert 50 is provided for use in retrofitting existing heat transfer components to mitigate fouling. The insert 50 will be described in connection with FIG. 9. The insert 50 is sized such that the outer diameter of the insert is sized to abut the inner diameter surface of the tube 60. The tube 60 is secured to a tube sheet 70. Since it is intended that the insert 50 is to be retrofit in existing operation heat transfer components, it is contemplated that a layer of corrosion 61 (e.g., an oxidized layer) may exist between the tube 60 and the insert 50. It is also possible to use the insert for fitting over a tube. In this case, the insert is sized to closely surround the tube, which is susceptible to fouling, build-up or corrosion on its outer diameter surface. The insert 50 in accordance with the present invention may be constructed from any of the materials described herein having the above described surface roughnesses. It is important that the insert or sleeve 50 contact the tube 60 such that the heat transfer properties are not adversely or significantly diminished.

One advantage of the use of inserts 50 is that it allows one to retrofit an existing heat exchanger and convert it thereby to a non-fouling heat exchanger. This avoids the cost and time associated with the construction of a new bundle. For example, an existing heat exchanger subject to repeated fouling and requiring significant downtime due to required cleaning could be retrofitted with stainless steel inserts and electropolished in situ to achieve a smooth, corrosion-resistant, non-fouling tube inner diameter surface. This would be much cheaper than replacing the entire heat exchanger bundle with a stainless steel equivalent (including tube sheets and baffles) and using electro-polished stainless steel tubes.

An additional advantage is that in some applications, it is not possible to use solid tubes made of a given alloy, even if this could prevent fouling on the inner diameter. As such, it is possible to use an insert with new or replacement tubes. For example, there are real world examples where fouling on the tube inner diameter could be prevented by use of an electropolished stainless steel tube instead of the currently used 5-chrome tube. However, in this case, the shell side, or the tube outer diameter, is exposed to an aqueous environment at elevated temperatures where stainless steel cannot be used. The potential for stress corrosion cracking is the issue. The advantage of the present invention is that an electro-polished stainless steel insert can be used within the 5-chrome tube. The electro-polished stainless steel inserts reduces fouling on the tube inner diameter and the 5-chrome tube itself is adequate with respect to the aqueous environment on the tube outer diameter. Similarly, highly corrosion resistant and reduced surface roughness titanium alloy inserts could be inserted within a less corrosion resistant outer tube for use in applications where a highly corrosive process fluid is passing though the tubes and a less corrosive fluid is in contact with the outer diameter. These are just two examples of the generic situation where the use of electro-polished inserts may be the only feasible route to reducing tube inner diameter fouling.

The insert 50 is relevant to fouling beyond the petroleum and petrochemical industries. Other potential applications include for example, black liquor fouling and paper slurry pipe systems in the paper and pulp industry, microbiological contamination (bio-fouling) in the water treatment and distillation industry, product contamination in the pharmaceutical and semiconductor industries, reduction of contamination pick-up and increasing the effectiveness of conventional decontamination techniques for recirculation piping in the nuclear power industry and piping and exchangers used in the food, dairy and beverage industries where product build-up is a problem. Polymer sheeting in chemical reactor piping and heat exchangers used to produce polymers could also benefit as well as heat exchangers used to remove water during crystallization processes. There are many other examples of heat exchanger and piping fouling that can be ameliorated by this invention.

Many potential metal types can be used to form the insert 50 and the metal chosen will depend on the nature of the fluid stream and the type of fouling that is being prevented. Though austenitic stainless steels such as types 304 and 316 can be used to fabricate the tube inserts, other stainless steel alloys could also be used, such as martensitic stainless steels such as type 410, ferritic stainless steels such as type 430. Other high performance alloys could also be considered such as super-austenitic stainless steels such as AL-6XN, duplex steels such as alloy 2205 and superferritic grades. Nickel based alloys will also be useful in certain environments and include the Ni—Cu, Ni—Cr—Fe, and Ni—Cr—Mo—Fe families of alloys. Cobalt and titanium alloys are also possible as well as pure metal inserts. Any metal or alloy that can be electropolished or otherwise smoothed is a possible material for use as an insert.

Electropolishing or other means of reducing the surface roughness, as described above, may be used either before or after the tube with the insert is installed in the heat exchanger bundle to obtain the desired surface roughness. In some instances, it might be most advantageous to install the inserts into tubes that are already themselves installed within a heat exchanger and then electropolish the inserts. In other cases, it might be preferred to produce a stockpile of heat exchanger tubes with installed inserts and electropolish these before they are rolled into the tubesheets. The former scenario might be appropriate to retrofit a relatively new heat exchanger bundle in which the tubes are still in good shape or in construction of a new heat exchanger bundle, whereas the latter might be appropriate for retrofitting an older bundle for which re-tubing might be in order.

Figure 9:
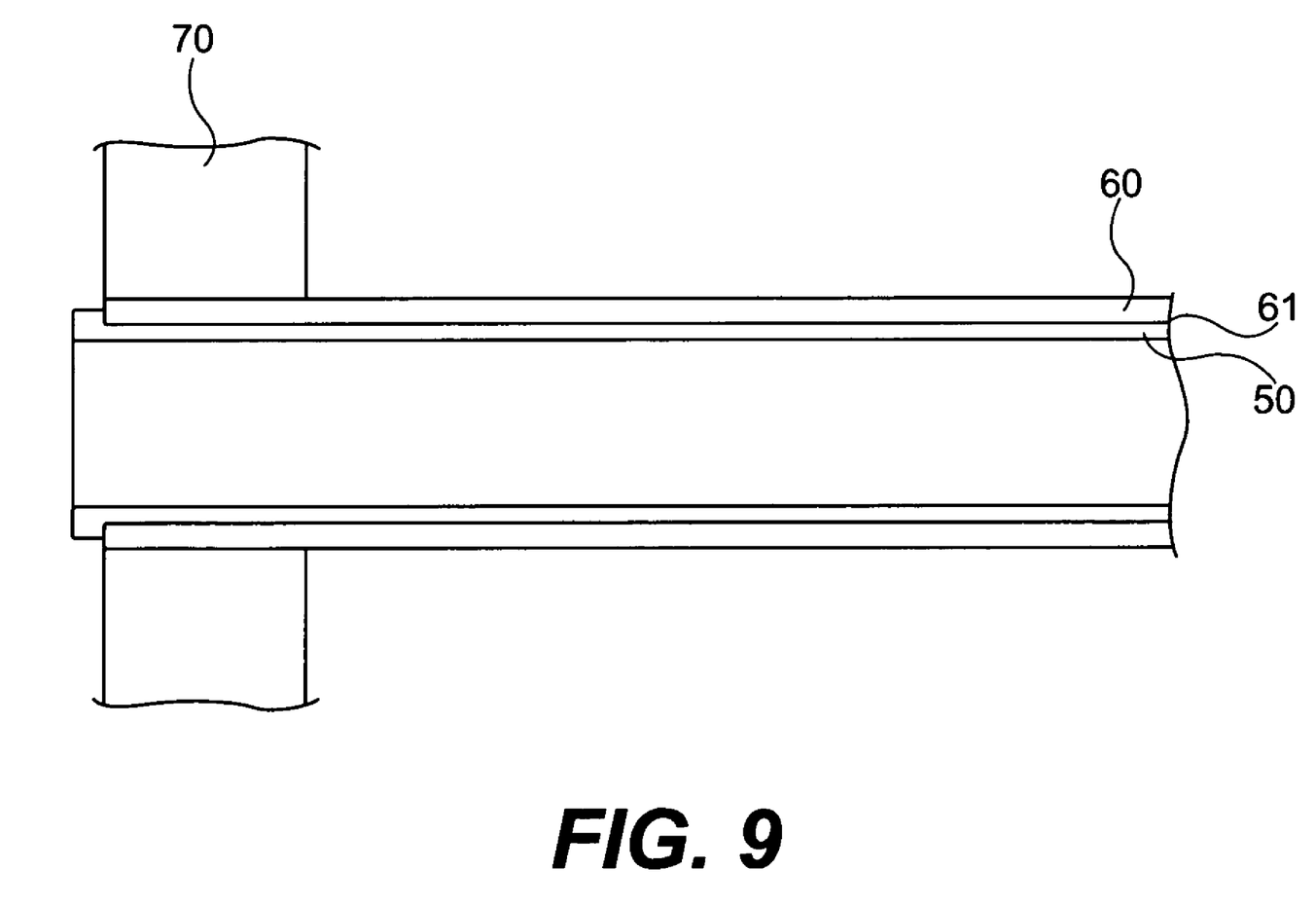
FIG. 9 is an insert sleeve in accordance with the present invention.

As is currently the case with installing inserts into heat exchanger tubes, good metal-to-metal contacting must be insured in order to minimize heat transfer losses that could occur due to air gaps between the outer tube and the tube liner. In all cases, the tube inner diameter must be as clean as possible and free of solids or liquids before the insert is expanded. Even with cleaning, a layer of corrosion 61 may exist. Ensuring a clean surface is relatively straight forward for new tubing, but can be more problematic for used tubing. Hydroblasting of the used tube, drying and light mechanical honing may be required. Following hydrostatic expansion of the insert, mechanical rolling of the ends of the inserts is also required to produce a good mechanical seal between the insert and the outer tube. A tube would be similarly prepared for use with an "outer" insert or sleeve.

Figure 3:
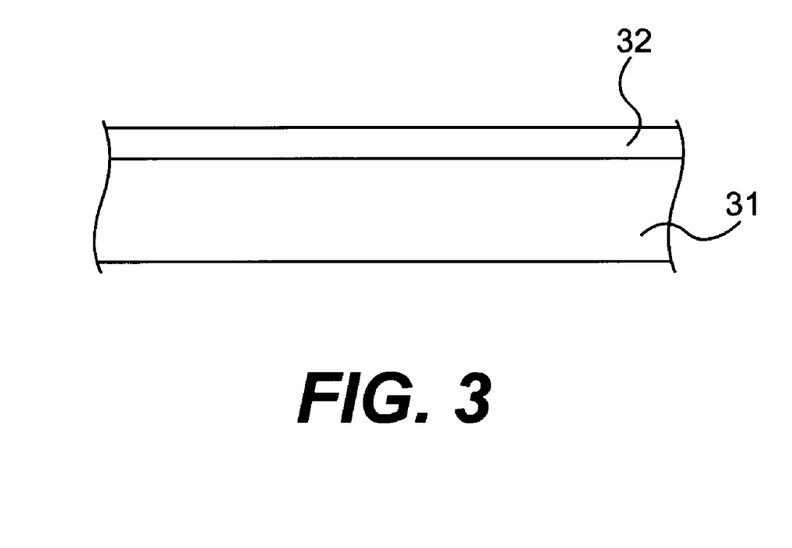
FIG. 3 is a schematic view illustrating the various layers forming the aluminum clad carbon steel utilized in forming the heat transfer components in accordance with an another embodiment of the present invention.

A variation of the present invention will now be described in greater detail in connection with FIG. 3. FIG. 3 illustrates an aluminum or aluminum alloy coated carbon steel that may be effective in reducing corrosion and mitigating fouling. A carbon steel layer 31 is coated or clad with an aluminum layer 32. The aluminum layer or aluminum alloy may be applied by immersion of the steel in molten aluminum or aluminum alloy or by thermal spraying of aluminum powder or wire that is atomized. When used in a tube 14, the aluminum layer 32 is located on both the inner diameter surface and the outer diameter surface of the tube 14 similar to the Cr-enriched layer 22. The insert 50 may be formed from this material with the layer 32 being located on only one side of the insert.

In accordance with another aspect of the invention, the heat transfer component, such as heat exchange tubes or inserts, can be constructed from a chromium-enriched oxide containing the material having a composition containing $\delta$, $\epsilon$, and $\zeta$. In this case, $\zeta$ is a steel containing at least about 5 to about 40 wt. % chromium. $\epsilon$ is a layer formed on the surface of the steel $\zeta$ and is a chromium-enriched oxide ($M_3O_4$ or $M_2O_3$ or mixtures thereof) wherein the metal M contains at least 5 wt. % Cr based on the total weight of the metal M. $\delta$ is a top layer formed on the surface of the chromium-enriched oxide $\epsilon$ comprising sulfide, oxide, oxysulfide, and mixtures thereof The steel $\zeta$ contains at least about 5 to about 40 wt. % chromium and is selected from low chromium steels, ferritic stainless steels, martensitic stainless steels, austenetic stainless steels, duplex stainless steels and precipitation-hardenable alloys. A non-limiting example of the base metal $\zeta$ is listed in Table 2, below.

| Base Metal, $\zeta$ | Alloy | UNS No. | Alloy Compositions (Weight %) |
|---|---|---|---|
| Low chromium steels | T5 | S50100 | Bal. Fe: 5Cr: 0.5Mo, 0.5Si, 0.3Mn, 0.15C, 0.04P, 0.03S |
| | T9 | J82090 | Bal. Fe: 9Cr: 1.0Si, 0.35Mn, 0.02C, 0.04P, 0.045S |
| Ferritic stainless steels | 409 | S40900 | Bal. Fe: 10.5Cr: 1.0Si, 1.0Mn, 0.5Ni, 0.5Ti, 0.08C, 0.045P, 0.045S |
| | 410 | S41000 | Bal. Fe: 11.5Cr: 0.15C, 0.045P, 0.03S |
| | 430 | S43000 | Bal. Fe: 16.0Cr: 1.0Si, 1.0Mn, 0.12C, 0.045P, 0.03S |
| Austenetic stainless steels | 304 | S30400 | Bal. Fe: 8Ni: 18Cr: 2.0Mn, 0.75Si, 0.08C, 0.04P, 0.03S |
| | 310 | S31000 | Bal. Fe: 19Ni: 24Cr: 2.0Mn, 1.5Si, 0.75Mo, 0.25C, 0.045P, 0.03S |
| | 253 MA | S30815 | Bal. Fe: 11Ni: 21Cr: 1.7Si, 0.04Ce, 0.17N, 0.08C |
| | RA8 5H | S30615 | Bal. Fe: 14.5Ni: 18.5Cr: 3.5Si: 1.0Al, 0.2C |
| Duplex stainless steels | 2205 | S32205 | Bal. Fe: 4.5Ni: 22Cr: 2.0Mn, 1.0Si, 3.0Mo, 0.03C, 0.14N, 0.03P, 0.02S |
| | 2507 | S32507 | Bal. Fe: 6Ni: 24Cr: 1.2Mn, 0.8Si, 3.0Mo, 0.5Cu, 0.03C, 0.2N, 0.035P, 0.02S |

The chromium-enriched oxide $\epsilon$ ($M_3O_4$ or $M_2O_3$ or mixtures thereof) can be formed on the surface of the steel $\zeta$ before use of the chromium-enriched oxide containing material, for example in a late-train crude preheat exchanger. The metal M of the chromium enriched oxide $\epsilon$ ($M_3O_4$ or $M_2O_3$ or mixtures thereof) preferably contains at least 5 wt. % Cr, preferably at least 10 wt. % Cr, based on the total weight of the metal M. The metal M of the chromium enriched oxide $\epsilon$ ($M_3O_4$ or $M_2O_3$ or mixtures thereof) preferably comprises Fe, Cr, and constituting elements of the steel $\zeta$. Constituting elements of the steel $\zeta$ contain Ni, Co, Mn, Al, Si, B, C, N, P, Y, Ce, Ti, Zr, Hf, V, Nb, Ta, Mo, W, and mixtures thereof. The metal M of the chromium enriched oxide $\epsilon$ ($M_3O_4$ or $M_2O_3$ or mixtures thereof) is preferred to be Cr-rich. Excessive partitioning of Cr in the chromium enriched oxide $\epsilon$ ($M_3O_4$ or $M_2O_3$ or mixtures thereof) attributes to superior corrosion resistance of the steel $\zeta$. Chromium preferably enters to vacancy sites of the oxide lattice and effectively suppresses iron transport from the steel, a prerequisite for sustaining corrosion.

The chromium enriched oxide $\epsilon$ ($M_3O_4$ or $M_2O_3$ or mixtures thereof) is formed on the surface of the steel $\zeta$ by exposing the steel $\zeta$ to a low oxygen partial pressure environment at a temperature of from about 300° C. to 1100° C. for a time sufficient to effect the formation of a chromium enriched oxide ($M_3O_4$ or $M_2O_3$ or mixtures thereof) on the surface of the steel. Thermodynamically, an oxide forms on a metal surface when the oxygen potential in the environment is greater than the oxygen partial pressure in equilibrium with the oxide. For example, the partial pressure of oxygen in equilibrium with $Cr_2O_3$ at 1000° C. is about $10^{-21}$ atm. This implies that the formation of $Cr_2O_3$ is favored thermodynamically at 1000° C. in environments with oxygen partial potentials higher than $10^{-21}$ atm.

A low oxygen partial pressure environment can be generated from gases selected from the group consisting of $CO_2$, CO, $CH_4$, $NH_3$, $H_2O$, $H_2$, $N_2$, Ar, He and mixtures thereof. As a non-limiting example, $CO_2/CO$ and $H_2O/H_2$ gas mixtures can be used. A time sufficient to effect the formation of the chromium enriched oxide $\epsilon$ ($M_3O_4$ or $M_2O_3$ or mixtures thereof) on the surface of the steel ranges from 1 min to 100 hrs. The thickness of the chromium-enriched oxide $\epsilon$ ($M_3O_4$ or $M_2O_3$ or mixtures thereof) ranges from at least about 1 nm to about 100 μm, preferably from at least about 10 nm to about 50 μm, more preferably from at least about 100 nm to about 10 μm. The chromium-enriched oxide $\epsilon$ provides superior corrosion and fouling resistance beneficial in heat exchanger tubes in refinery applications.

The chromium enriched oxide $\epsilon$ ($M_3O_4$ or $M_2O_3$ or mixtures thereof) may be formed on the surface of the steel $\zeta$ by bright annealing method. Bright annealing is an annealing process that is carried out in a controlled atmosphere furnace or vacuum to provide low oxygen partial pressure environments in order that oxidation is reduced to a minimum and the surface remains relatively bright. The process conditions such as atmosphere, temperature, time and heating/cooling rate utilized during the bright annealing process are dependent on the metallurgy of the alloy being acted upon. The skilled artisan can easily determine the conditions based on the alloy's metallurgy. As a non-limiting example, the austenitic stainless steel such as 304L can be bright annealed in either pure hydrogen or argon or dissociated ammonia, provided that the dew point of the atmosphere is less than −40° C. and the tubes, upon entering the furnace, are dry and scrupulously clean. Bright annealing temperatures usually are above about 1038° C. Time at temperature is often kept short to hold surface scaling to a minimum or to control grain growth. Vacuum furnaces can generally achieve the best atmospheric quality for bright annealing purposes. Vacuum levels in the furnace must be better than $1 \times 10^3$ Torr. Fast cooling in vacuum furnaces is generally achieved by back filling the chamber with argon or nitrogen and then re-circulating this gas at high velocity through a heat exchanger to remove heat.

For the top layer $\delta$, sulfide and oxysulfide form on the surface of the chromium-enriched oxide $\epsilon$ in-situ during use of the chromium-enriched oxide containing material, in a late-train crude preheat exchanger for instance. The temperature at which the protective layer forms varies. In a late-train heat exchanger applications, the protective layer forms at temperatures up to 400° C. In applications in a furnace or outside the late-train heat exchanger, the protective layer forms at temperatures up to 600° C. In petrochemical applications including use in steam cracker and reformer tubes, the protective layer forms at temperatures up to 1050° C. The temperatures utilized during the formation of the protective layer will be dependent on the metallurgy of the steel being acted upon. The skilled artisan can easily determine the upper temperature constraints based on the steel's metallurgy. The top layer $\delta$ may contain some impurities formed from the elements constituting the chromium enriched oxide $\epsilon$ and the steel $\zeta$. Preferably, the top layer $\delta$ comprises iron sulfide ($Fe_{1-x}S$), iron oxide ($Fe_3O_4$), iron oxysulfide, iron-chromium sulfide, iron-chromium oxide, iron-chromium oxysulfide, and mixtures thereof. The thickness of the top layer $\delta$ ranges from at least about 0.1 μm to about 50 μm, preferably from at least about 0.1 μm to about 30 μm, more preferably from at least about 0.1 μm to about 10 μm.

Thus, the chromium-enriched oxide containing material so formed is utilized to construct a surface that reduces sulfidation corrosion and reduces depositional fouling, in heat exchangers for example, especially in late-train crude preheat exchangers. The surface has a surface roughness of less than 40 micro inches (1.1 μm), preferably less than 20 micro inches (0.5 μm), and more preferably less than 10 micro inches (0.25 μm). The chromium-enriched oxide $\epsilon$ ($M_3O_4$ or $M_2O_3$ or mixtures thereof) can be formed on the inner diameter (ID), the outer diameter (OD) or both the ID and the OD of the steel $\zeta$, depending on the need for mitigating corrosion and fouling. The chromium enriched oxide $\epsilon$ ($M_3O_4$ or $M_2O_3$ or mixtures thereof) is formed on the surface of the steel $\zeta$ by exposing the ID, OD or both the ID and OD of the steel $\zeta$, as described above.

In accordance with another aspect of the invention, the heat transfer component, such as exchange tubes, can be constructed from a silicon-containing steel composition containing an alloy and a non-metallic film formed on the surface of the alloy. The alloy is a composition formed of the materials $\eta$, $\theta$, and $\iota$. In this case, $\eta$ is a metal selected from the group consisting of Fe, Ni, Co, and mixtures thereof. $\theta$ is Si. Component $\eta$ is at least one alloying element selected from the group consisting of Cr, Al, Mn, Ti, Zr, Hf, V, Nb, Ta, Mo, W, Sc, La, Y, Ce, Ru, Rh, Ir, Pd, Pt, Cu, Ag, Au, Ga, Ge, As, In, Sn, Sb, Pb, B, C, N, P, O, S and mixtures thereof. The non-metallic film comprises sulfide, oxide, carbide, nitride, oxysulfide, oxycarbide, oxynitride and mixtures thereof, and is formed on top of the alloy.

The non-metallic film formed on the surface of an alloy contains at least one of a Si-partitioned oxide, sulfide, carbide, nitride, oxysulfide, oxycarbide, oxynitride and mixtures thereof. The temperature at which the non-metallic film forms varies. In a late-train heat exchanger applications, the non-metallic film forms at temperatures up to 400° C. In applications in a furnace or outside the late-train heat exchanger, the non-metallic film forms at temperatures up to 600° C. In petrochemical applications including use in steam cracker and reformer tubes, the non-metallic film forms at temperatures up to 1100° C. The temperatures utilized during the formation of the non-metallic film will be dependent on the metallurgy of the steel being acted upon. The skilled artisan can easily determine the upper temperature constraints based on the steel's metallurgy. The Si-partitioned oxide or oxysulfide film effectively retards iron transport in the non-metallic film (e.g iron sulfide corrosion scale), thus sulfidation corrosion is substantially mitigated. Optionally, further surface smoothing of the alloy surface of a silicon-containing steel composition can provide the heat exchange surface, such as heat exchanger tubes in refinery applications, with superior fouling resistance.

In particular, for the alloy, the metal η, selected from the group consisting of Fe, Ni, Co, and mixtures thereof, can have a concentration that ranges from at least about 60 wt. % to about 99.98 wt. %, preferably at least about 70 wt. % to about 99.98 wt. %, and more preferably at least about 75 wt. % to about 99.98 wt. %. It is preferred that the metal η is Fe. It is well known that pure Fe has much better sulfidation resistance than pure Ni and pure Co.

The metal θ is Si. The alloy contains Si at least about 0.01 wt. % to about 5.0 wt. %, and preferably at least about 0.01 wt. % to about 3.0 wt. %. The metal Si in the alloy promotes formation of Si-partitioned oxide of oxysulfide in the non-metallic film formed on top of the alloy when it is exposed to a high temperature stream, such as a crude oil stream at temperatures up to 400° C. or higher.

The metal ι is at least one alloying element selected from the group consisting of Cr, Al, Mn, Ti, Zr, Hf, V, Nb, Ta, Mo, W, Sc, La, Y, Ce, Ru, Rh, Ir, Pd, Pt, Cu, Ag, Au, Ga, Ge, As, In, Sn, Sb, Pb, B, C, N, P, O, S and mixtures thereof. The concentration of metal ι of the alloy ranges from at least about 0.01 wt. % to about 30.0 wt. %, preferably at least about 0.01 wt. % to about 30.0 wt. %, and more preferably at least about 0.01 wt. % to about 25.0 wt.

It is preferred that the metal ι is Al. The alloy contains Al at least about 0.01 wt. % to about 5.0 wt. %, and preferably at least about 0.01 wt. % to about 3.0 wt. %. Al provides the alloy with synergistic sulfidation corrosion resistance. Thus, the alloy in this case contains Si in an amount of at least about 0.01 wt. % to about 5.0 wt. %, and preferably at least about 0.01 wt. % to about 3.0 wt. %, and Al in an amount of at least about 0.01 wt. % to about 5.0 wt. %, and preferably at least about 0.01 wt. % to about 3.0 wt. %.

The metal ι can also include Cr. In that case, the alloy contains Cr at least about 0.01 wt. % to about 40.0 wt. %. Cr provides the alloy with synergistic sulfidation corrosion resistance. Thus, the alloy according to this composition will contain Si in an amount of at least about 0.01 wt. % to about 5.0 wt. %, and preferably at least about 0.01 wt. % to about 3.0 wt. %, and Cr in an amount of at least about 0.01 wt. % to about 40.0 wt. % and preferably at least about 0.01 wt % to about 30.0 wt %.

The metal ι can also be a combination of elements. For example, the alloy can contains Si (component θ) in an amount of at least about 0.01 wt. % to about 5.0 wt. %, and preferably at least about 0.01 wt. % to about 3.0 wt. %, Al in an amount of at least about 0.01 wt. % to about 5.0 wt. %, and preferably at least about 0.01 wt. % to about 3.0 wt. %, and Cr in an amount of at least about 0.01 wt. % to about 40.0 wt. % and preferably at least about 0.01 wt % to about 30.0 wt %.

A non-limiting example of the alloy having the composition η, θ, and ι is listed in Table 3, below.

| Alloy Name | Wt. % of Elements |
|---|---|
| EM-1001 | Balanced Fe: 3.0Si: 0.1C |
| EM-1002 | Balanced Fe: 2.5Si: 0.5Mn: 0.15C |
| EM-1003 | Balanced Fe: 1.5Si: 5.0Cr: 0.5Mo: 0.3Mn: 0.15C: 0.04P: 0.03S |
| EM-1004 | Balanced Fe: 1.5Si: 5.0Cr: 0.5Mo: 0.5Mn: 0.1C |
| EM-1005 | Balanced Fe: 2.5Si: 5.0Cr: 0.5Mo: 0.5Mn: 0.1C |
| EM-1006 | Balanced Fe: 2.5Si: 5.0Cr: 0.5Al: 0.1C |
| EM-1007 | Balanced Fe: 2.5Si: 5.0Cr: 0.5Al: 0.5Mo: 0.5Mn: 0.1C |
| EM-1008 | Balanced Fe: 2.5Si: 5.0Cr: 0.5Al: 0.5Mo: 0.5Mn: 0.5Ti: 0.1C |

The non-metallic film formed on the surface of the alloy comprises sulfide, oxide, carbide, nitride, oxysulfide, oxycarbide, oxynitride and mixtures thereof. The non-metallic film can comprise at least a 1 nm thick Si-partitioned non-metallic film and can consist of at least 10 atomic percent Si based on the concentration of the non-metallic film. Preferably, the Si-partitioned non-metallic film is an oxide or oxysulfide. The Si-partitioned oxide or oxysulfide film effectively retards iron transport, thus sulfidation corrosion is substantially mitigated. The Si-partitioned oxide or oxysulfide film is preferably formed on the exposed surface of the heat exchanger, for example on one or both of the exposed exterior surface and the interior surface of a late-train crude preheat exchanger tube.

The non-metallic film can be formed in-situ within the heat transfer component. The initial non-metallic film is preferably formed by exposing the alloy to a crude oil stream at high temperatures up to 400° C. Thus, the non-metallic film is formed on the surface of the alloy to construct a surface that reduces sulfidation corrosion and reduces depositional fouling, in heat exchangers for example, especially in late-train crude preheat exchangers. The material forms a surface having a surface roughness of less than 40 micro inches, preferably less than 20 micro inches and more preferably less than 10 micro inches. The non-metallic film can be formed on the inner diameter (ID), the outer diameter (OD) or both the ID and the OD of the alloy, depending on the need for mitigating corrosion and fouling. The non-metallic film is formed on the surface of the alloy by exposing the ID, OD, or both the ID and OD of the alloy to a high temperature, as described above.

It is another aspect of the present invention to combine heat transfer components having the above described corrosion resistant materials with either a pulsation generating device or a vibrational generating device to further reduce and mitigate fouling. The devices are generically designated in FIG. 1 with reference numeral 3.

It is contemplated that the pulsation device will comprise any means for applying liquid pressure pulsations to the tube side liquid. In the simplest concept, the device may comprise a reciprocating pump type mechanism with a cylinder connected to the inlet/outlet conduits of the exchanger and a reciprocating piston in the cylinder to vary the internal volume of the cylinder. As the piston moves within the cylinder, the liquid will alternately be drawn into the cylinder and then expelled from it, creating pulsations in the conduit to which the device is connected. The use of a double-acting pump of this kind with one side connected to the inlet conduit and the other connected to the outlet conduit is particularly desirable since it will create the desired pressure pulsations in the tubes regardless of the pressure drop occurring in the exchanger tube bundle. Variation in the frequency of the pulsations may be afforded by variations in the reciprocation speed of the piston and any desired variations in pulsation amplitude may be provided by the use of a variable displacement pump, e.g. a variable displacement piston pump, swashplate (stationary plate) pump and its variations such as the wobble plate (rotary plate) pump or bent axis pump.

The present invention is not intended to be limited to the above-described pump; rather, it is contemplated that other types of pumps may also be used as the pulsation device including diaphragm pumps and these may be practically attractive since they offer the potential for activation of the diaphragm by electrical, pneumatic or direct mechanical means with the movement of the diaphragm controlled to provide the desired frequency and amplitude (by control of the extent of diaphragm movement). Other types may also be used but gear pumps and related types such as the helical rotor and multi screw pumps which give a relatively smooth (non pulsating) fluid flow are less preferred in view of the objective of introducing pulsations which disrupt the formation of the troublesome boundary layer. Other types which do produce flow pulsations such as the lobe pump, the vane pump and the similar radial piston pump, are normally less preferred although they may be able to produce sufficient pulsation for the desired purpose. Given the objective is to induce pulsations, other types of pulsator may be used, for example, a flow interrupter which periodically interrupts the liquid flow on the tube side. Pulsators of this type may include, for example, siren type, rotary vane pulsators in which the flow interruption is caused by the repeated opening and closing of liquid flow passages in a stator/rotor pair, each of which has radial flow openings which coincide with rotation of the moving rotor member. The rotor may suitably be given impetus by the use of vanes at an angle to the direction of liquid flow, e.g. by making radial cuts in the rotor disc and bending tabs away from the plane of the disc to form the vanes. Another type is the reed valve type with spring metal vanes which cover apertures in a disc and which are opened temporarily by the pressure of the fluid in the tube, followed by a period when the vane snaps closed until fluid pressure once more forces the vane open.

In order to optimize the impact within the heat transfer component, it is preferable to locate the pulsation device close to the exchanger in order to ensure that the pulsations are efficiently transferred to the liquid flow in the tube bundle, that is, the pulsations are not degraded by passage through intervening devices such as valves. Normally, the frequency of the liquid pulsations will be in the range of 0.1 Hz to 20 kHz. The amplitude of the pulsation as measured by the incremental flow rate through the heat exchange tubes could range from about the order of the normal heat exchanger flow rate at the lower end of the range of pulsation frequencies to less than $10^{-6}$ of the normal flow rate at the higher frequencies; because of pressure drop limitations in the heat transfer component operation and/or dissipation of higher frequencies in the fluid, the upper limit of the pulse amplitude will decrease with increased frequency. Thus, for example, in the lower half of this frequency range, the amplitude of the pulsations could be from about 10–2 to about the normal flow rate and with frequencies in the upper half of the range, from about 10–6 to 0.1 of the normal flow rate through the exchanger.

It is contemplated that the vibration producing device may be any means that is capable of imparting a vibration force on the heat exchanger unit. The vibration producing device may be of the kind disclosed in co-pending U.S. patent Ser. No. 11/436,802. The vibration producing device may be externally connected to the heat exchange unit to impart controlled vibrational energy to the tubes of the bundle. The vibration producing device can take the form of any type of mechanical device that induces tube vibration while maintaining structural integrity of the heat exchanger. Any device capable of generating sufficient dynamic force at selected frequencies would be suitable. The vibration producing device can be single device, such as an impact hammer or electromagnetic shaker, or an array of devices, such as hammers, shakers or piezoelectric stacks. An array can be spatially distributed to generate the desired dynamic signal to achieve an optimal vibrational frequency. The vibration producing device may be placed at various locations on or near the heat exchange unit as long as there is a mechanical link to the tubes. Sufficient vibration energy can be transferred to the tubes of the heat exchanger at different vibration modes. There are low and high frequency vibration modes of tubes. For low frequency modes (typically below 1000 Hz), axial excitation is more efficient at transmitting vibration energy, while at high frequency modes, transverse excitation is more efficient. The density of the vibration modes is higher at a high frequency range than at a low frequency range (typically below 1000 Hz), and vibration energy transfer efficiency is also higher in the high frequency range. Further, displacement of tube vibration is very small at high frequency (>1000 Hz) and insignificant for potential damage to the tubes.

It will be apparent to those skilled in the art that various modifications and/or variations may be made without departing from the scope of the present invention. While the present invention has been described in the context of the heat exchanger in a refinery operation. The present invention is not intended to be so limited; rather, it is contemplated that the desired surface roughness and materials disclosed herein may be used in other portions of a refinery operation where fouling may be of a concern. Reducing the surface roughness of other corrosion resistant materials such as aluminized carbon steel, titanium, electroless nickel-coated carbon steel and other corrosion resistant surfaces are extensions of this concept as delineated below. It is contemplated that the method of reducing fouling disclosed herein can be combined with other reduction strategies to reduce fouling. This includes combining the low surface roughness and/or material compositions disclosed herein with vibrational, pulsation, helical shell-side baffles and internal turbulence promoters. Thus, it is intended that the present invention covers the modifications and variations of the method herein, provided they come within the scope of the appended claims and their equivalents.

What is claimed is:

1. A heat transfer component for heating a process stream, comprising:
   a heat transfer element for heating the process stream, wherein the heat transfer element is formed from a first material and has an inner diameter surface and an outer diameter surface;
   a sleeve which is formed of a steel composition that is resistant to sulfidation corrosion and corrosion induced fouling, comprising three materials, X, Y, and Z, where
   X is a metal selected from Fe, Ni, Co and mixtures thereof,
   Y is Cr, and
   Z is at least one alloying element selected from Si, Al, Mn, Ti, Zr, Hf, V, Nb, Ta, Mo, W, Sc, Y, La, Ce, Pt, Cu, Ag, Au, Ru, Rh, Ir, Ga, In, Ge, Sn, Pb, B, C, N, O, P, and S,
   wherein the sleeve has (i) a first surface adapted to contact one of the inner diameter surface and the outer diameter surface of the heat transfer element and (ii) a second surface adapted to contact the process stream which surface has a surface roughness of less than 40 micro inches (1.1 µm), a Cr-enriched layer formed from the steel composition X, Y and Z, in which the ratio of Y to X in the Cr-enriched layer is greater than the ratio of Y to X in the remaining portion of the sleeve and a protective layer comprising an oxide layer, a sulfide layer, an oxysulfide layer or a combination thereof formed on a surface of the Cr-enriched layer.

2. The transfer component according to claim 1, wherein the surface roughness is less than 20 micro inches (0.5 µm).

3. The heat transfer component according to claim 2, wherein the surface roughness is less than 10 micro inches (0.25 μm).

4. The heat transfer component according to claim 1, wherein
Z is at least one alloying element selected from Si, Al, Mn, Ti, Zr, Hf, V, Nb, Ta, Mo, W, Cu, B, C, N, O, P, or S.

5. The heat transfer component according to claim 1, wherein the Cr-enriched layer is formed by electro-polishing the second surface of the sleeve.

6. The heat transfer component according to claim 1, wherein the surface roughness of the Cr-enriched layer is less than 20 micro inches (0.5 μm).

7. The heat transfer component according to claim 6, wherein the surface roughness of the Cr-enriched layer is less than 10 micro inches (0.25 μm).

* * * * *